Dec. 8, 1931.   S. K. VARNES   1,835,827
METHOD OF AND APPARATUS FOR EFFECTING SYNTHESIS
Filed Nov. 18, 1925   2 Sheets-Sheet 1
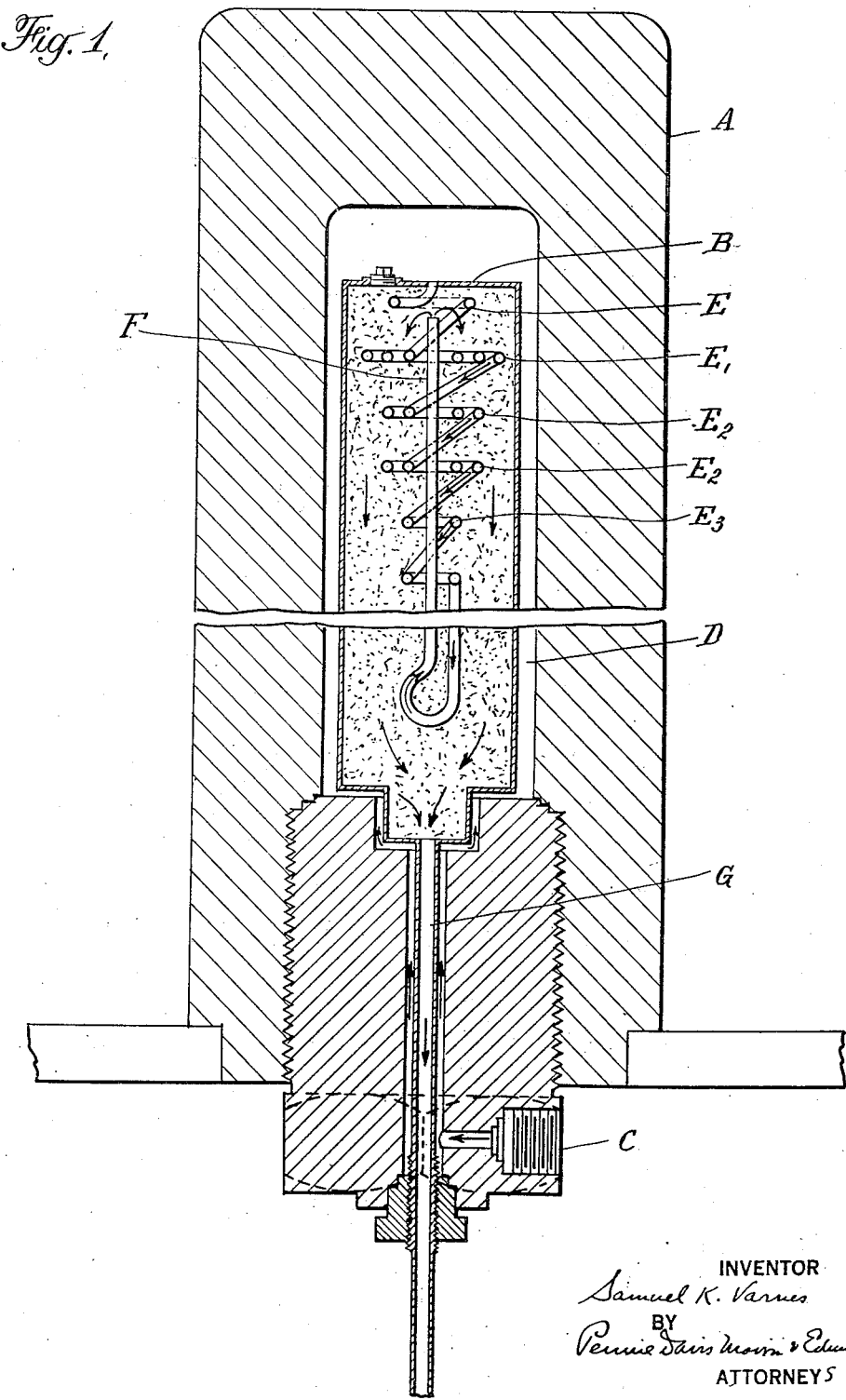
INVENTOR
Samuel K. Varnes
BY
Pennie Davis Marvin & Edmonds
ATTORNEYS

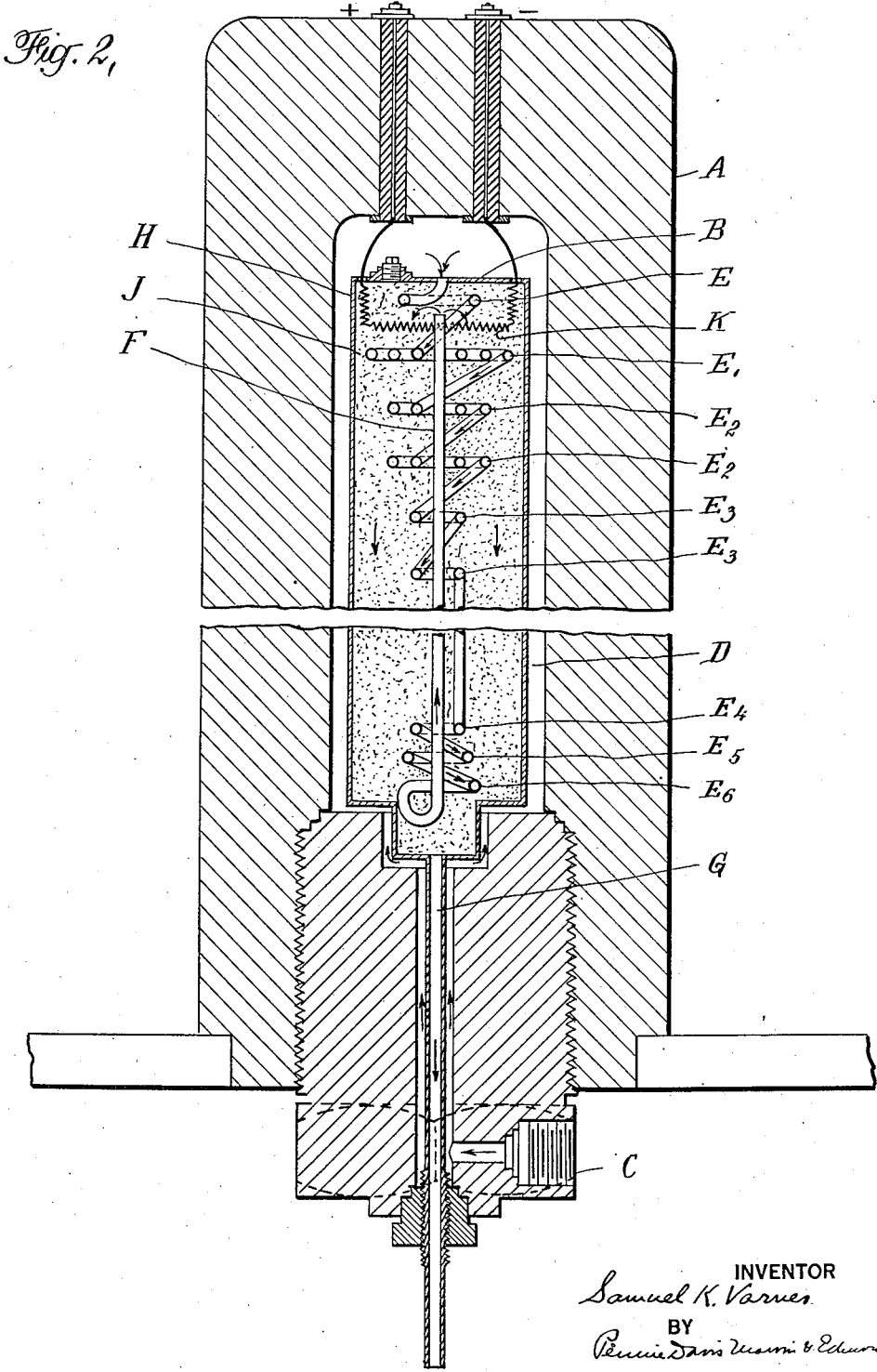

Patented Dec. 8, 1931

1,835,827

UNITED STATES PATENT OFFICE

SAMUEL K. VARNES, OF WILMINGTON, DELAWARE, ASSIGNOR TO DU PONT AMMONIA CORPORATION, OF WILMINGTON, DELAWARE, A CORPORATION OF DELAWARE

METHOD OF AND APPARATUS FOR EFFECTING SYNTHESIS

Application filed November 18, 1925. Serial No. 69,808.

This invention relates to an improved method of and apparatus for effecting catalytic exothermic gaseous reactions.

It is recognized that in carrying out catalytic exothermic gaseous reactions, particularly those of the type which, like the synthesis of ammonia, are effected under pressure, it is necessary to remove heat from the catalyst; otherwise the temperature of the catalyst will rapidy rise to values at which the physical form or activity of the catalyst may be unfavorably affected; the reaction equilibrium may be changed in such a way as to result in a lower conversion of the reacting gases; and/or undesirable side reactions may be accelerated.

The problem of removal of heat from the catalyst is complicated by the fact that the evolution of heat is by no means uniform throughout the body of catalyst. I have observed, for example, that in an apparatus for the synthesis of ammonia, in which the gases first contacted with the catalyst at a temperature of about 600° C., the temperature, during passage through the first 7 per cent. of the catalyst, rose rapidly to a maximum of about 700° C. This temperature was substantially maintained through the next 15 per cent. of the tube, but then fell off at a fairly constant rate until, on leaving the catalyst, the temperature of the gases was only about 400° C. From the standpoint of temperature distribution, the catalyst may, therefore, be considered as consisting of three zones: (1) a small zone in which the temperature rises; (2) a somewhat larger zone in which a major portion of the reaction occurs with the temperature rapidly increasing to a maximum; (3) a comparatively large zone in which the temperature falls and the conversion may be relatively small.

Assuming that the gases as they first contact with the catalyst are not hot enough for the reaction to actively begin, as they flow in contact with the catalyst, they will at first react relatively slowly until the heat evolved has raised their temperature to a value at which the reaction will actively begin. This point in the catalyst marks the end of the first zone. Now, if it is remembered that a rise in temperature increases the velocity but is unfavorable to the equilibrium of an exothermic reaction, it will be seen that in the next portions of the catalyst with which the gases contact, the reaction will take place with evolution of heat, and more and more rapidly, until a balance is established between the temperature attained and the equilibrium conversion corresponding to that temperature, which may be high enough to produce one or more of the unfavorable results previously referred to. This portion of the catalyst will, therefore, constitute a region of high temperature. Since the concentration of product in this zone will have practically reached the limit set by the high temperature, conversion brought about by the balance of the catalyst will be limited by the extent to which the gases are allowed to cool in contact with it and are thus brought into regions where the equilibrium conditions are more favorable. However, the tendency may be for the gases to cool too much, i. e., below the temperature at which the catalyst is effectively active, so that it may be that comparatively little conversion is effected in at least the latter part of the third zone of catalyst. Thus, in the case of the example of ammonia synthesis described above, the temperature was below 500° C. in the last 15 per cent. of the catalyst tube, which ordinarily is too low a temperature for efficient carrying out of the reaction.

Those portions of the catalyst that are subjected to the highest temperatures may be expected to be the first to suffer deterioration. As the activity of the first portion of the catalyst decreases, the next portion will gradually become the zone of high conversion and high temperature. When this in turn becomes inactive, the zone of high temperature will be transferred to a succeeding portion, and so on. It will be seen that thus the catalyst may all eventually be rendered inactive, and, as the process of deterioration goes on, progressively smaller amounts of active catalyst will be available to the gases contacting therewith.

It should be apparent from the foregoing that the question of temperature distribution within the catalyst, particularly as related to the removal of heat from the hot zone, and the maintenance of temperature in the latter portions of the succeeding zones, is important, the ideal condition to be sought being that in which the temperature is maintained uniform throughout the length of the catalyst container, or is allowed to decrease regularly, but not to such a degree that the reaction cannot actively proceed.

It is the object of the invention to provide a method of and apparatus for conducting catalytic exothermic gaseous reactions in which the ideal condition mentioned is approximately attained. Other objects and advantages of the invention will be better understood by reference to the following specification and accompanying drawings, in which Fig. 1 is a diagrammatic view of one form of apparatus adapted for use in carrying out the invention; and Fig. 2 is a similar view illustrating a slightly different application of the same principle.

I have discovered that uniform distribution of temperature within the catalyst can be approached and the economical utilization of the catalyst can be improved accordingly by cooling the catalyst in proportion to the heat developed in the several zones thereof. Thus, for example, with reference to the preceding discussion, the heat exchange should be relatively small for the first zone of catalyst, a maximum for the second zone, and should decrease progressively in the third zone. A further improvement may be accomplished by provding for the transfer of heat from the cooling media to the catalyst in the third zone in the event that the cooling medium attains a temperature in passing through the second zone which permits such transfer.

The purpose of the invention can be accomplished in various ways, but conveniently the cooling is effected by passing the gaseous mixture, which reacts subsequently in contact with the catalyst, through a coil embedded in the catalyst and consequently in immediate heat exchange relation therewith. To provide for the proportionate cooling of the catalyst in the successive zones, the size and number of convolutions of the coil may vary in those zones so that the cooling medium remains longer and is more widely distributed in the zone where the most intense heating occurs. Thus, in the first zone the coil may have a single loop and, since the hottest zone occurs directly thereafter, three loops may be provided therein. The coil may then have a series of two loops and finally a series of single loops of relatively small diameter. The tube forming the coil may then extend for some distance through the catalyst without loops. Preferably it should then return upon itself without loops so as to discharge the gaseous mixture into the catalyst at a point adjacent to its entrance to the coil. Of course, the number and diameter of the loops will be adjusted to the special temperature conditions which exist in the catalyst and since these differ in conducting various reactions and in different apparatus employed in carrying out the same reaction, it is not possible to lay down any hard and fast rule with respect to dimensions. In principle, the invention depends upon the adjustment of the cooling to maintain, as nearly as possible, a uniform temperature throughout the catalyst and the coils can be adjusted to meet the conditions which obtain in any method and apparatus.

Since, as has been indicated, the temperature in the last zone may tend to decrease to a point where the catalyst is no longer active, advantage can be taken of the heat stored in the cooling medium during its passage through the hottest zone to the catalyst to raise the temperature of the catalyst in the last zone. This is accomplished conveniently by providing a number of loops in this zone through which the heated gaseous mixture must pass before it is returned and delivered to the catalyst in the first zone. The number and dimensions of the loops will vary depending upon the temperature conditions which are met in the last zone.

The removal of heat from the catalyst by the provision of heat exchange means disposed within the catalyst in proportion to the heat developed in the several parts thereof is to be preferred to other methods that might be employed for accomplishing the objects of the invention. Among the numerous advantages it is important to note that the method described may be readily adapted to changing thermal conditions brought about by variations in gas composition, rates of flow, etc. Thus, for example, the extent to which heat can be removed through the exterior wall of the catalyst chamber is limited, both by the thermal conductivity of a wall of practical minimum thickness and by the fact that there is a practical limit beyond which the diameter of the catalyst chamber cannot be reduced with the object of increasing the ratio of heat exchange surface to catalyst volume. On the other hand, heat exchange means disposed within the body of the catalyst in accordance with the method hereinbefore described may be proportioned to the requirements of the various zones of the catalyst under a given set of operating conditions and may be modified readily or replaced suitably in the event that these conditions change. Furthermore, by this method a maximum of heat exchange may be provided with a minimum displacement of catalyst.

Referring to Fig. 1 of the drawings, A is the pressure-sustaining wall and B the catalyst container. In carrying out the synthesis of ammonia, a mixture of nitrogen and hydrogen in the proportion by volume of one to three and free from contact poisons, is passed under a pressure of 900 atmospheres, and at a temperature of 60° C. into the apparatus through an inlet C. Here the entering gases are warmed by indirect contact with the oppositely flowing stream of outgoing gases. The gases pass through the annular passage D between the pressure-sustaining wall and the catalyst, and thus protect the former from the heat of the reaction and remove heat from the latter. Entering the catalyst container the gases flow through the heat exchanger, having several spiral coils E, $E_1$, $E_2$ and $E_3$ of such dimensions and so arranged that but little heat exchange is carried out in the first catalyst zone, a maximum amount in the second zone, and progressively smaller amounts in the third zone. While passing down through the coils E, $E_1$, $E_2$ and $E_3$, and up through the conduit F, the gases are warmed to such a degree that the reaction actively begins after they have contacted with but comparatively little of the catalyst. There will be a tendency for a region of high temperature to be established, for example, in the vicinity of the coil $E_1$, but this tendency is opposed by the effect of the proportionately distributed heat exchange so that a more uniform temperature gradient is maintained throughout the length of the catalyst than is ordinarily the case. The products of the reaction leave the apparatus by way of the tube G, the ammonia being separated from the unconverted gases by liquefaction or other suitable means. The unconverted gases may then be circulated again through the apparatus described, or they may be passed to another synthesis tube to complete the conversion.

In order to provide for occasional variations in temperature I employ as a control an external source of heat such as the electrical heating coil K. The operation of the process may advantageously be carried out in such a way that the gases normally tend to arrive at the catalyst too cold, the balance of the heat being supplied, as needed, by means of the heating coil. My invention may also be applied to the removal of heat by a cooling agent flowing outside the catalyst container, for example, the gases on their way to the reaction.

As I have previously pointed out, in some portions of the third zone of the catalyst, the tendency may be for the gases undergoing reaction to cool too much so that the temperature may be lower than that at which the reaction can actively proceed. My invention is adapted to improve this condition. For this purpose I not only employ heat exchange as heretofore described in proportion to the heat developed in the various parts of the catalyst, but also in the latter part of the third zone, where the tendency may be for the temperature to become too low, I provide heat exchange in proportion to the need for warming the catalyst. Thus, the cooling agent which has removed heat from the first two zones of catalyst and has been warmed accordingly, is enabled to impart heat to the too cooled portions of the catalyst in proportion to the need therefor.

Referring to Fig. 2 of the drawings, the apparatus is identical with that shown in Fig. 1 except for the additional coils $E_4$, $E_5$ and $E_6$. The thermal effects are the same as those previously described. At the lower end of the heat exchanger, the additional coils have an effective surface which increases progressively with the tendency for the catalyst temperature to be too low. Thus, as the gases pass through the heat exchanger and are warmed by cooling the catalyst in the first and second zones thereof, they are able to supply heat to the last zone of the catalyst where the addition of heat is desirable. It will be seen that this arrangement tends to effect an even more nearly uniform distribution of temperature than that exemplified in Fig. 1. From the coil $E_6$ the gases pass through F in further heat exchange relation with the catalyst, and then through and in contact with the catalyst. The products escape through the outlet G.

In this case, in order that the gases passing through the coils $E_4$, $E_5$ and $E_6$ may suitably warm the catalyst, conditions should be arranged (e. g. by modifying the degree of heat transfer effected in the coils E, $E_1$, $E_2$ and $E_3$) so that the gases flowing in $E_4$, $E_5$ and $E_6$ are at a temperature somewhat higher than that necessary for active reaction. Since under such circumstances the gases first contacting with the catalyst will be at a higher temperature than that contemplated in the first example, it may be advantageous to make the effective surface of the coil E more nearly equal to that of $E_1$.

I do not desire to limit myself in any way to the foregoing examples, it being obvious that those skilled in the art may apply my invention in a variety of specific ways. Various changes can be made in the method of operation and in the apparatus employed without departing from the invention or sacrificing any of the advantages thereof.

I claim:—

1. The method of effecting catalytic exothermic gaseous reactions which includes the step of removing heat from the catalyst in proportion to the heat developed in the several parts thereof by the passage of gas through but in non-reactive relation to the catalyst.

2. An apparatus for effecting catalytic exothermic gaseous reactions comprising a catalyst container including internal heat exchange means, the effective surface of whose several parts is proportional to the heat developed in those portions of the catalyst with which they contact.

3. The method of effecting catalytic exothermic gaseous reactions which comprises removing heat by gases going to the reaction through and not in actual contact with the catalyst in proportion to the heat developed in the several parts thereof.

4. The method of effecting catalytic exothermic gaseous reactions, which comprises withdrawing heat from the catalyst by internal heat exchange with a gaseous medium traveling in a spiral path through the catalyst, the path of the gaseous medium being arranged so that the heat withdrawn from the successive zones of the catalyst is proportional to the amount of heat developed in those zones.

5. The method of effecting catalytic exothermic gaseous reactions, which comprises withdrawing heat from the catalyst by internal heat exchange with a gaseous medium and in proportion to the amount of heat developed at successive zones of the catalyst and returning heat to the catalyst at other zones.

6. The method of effecting catalytic exothermic gaseous reactions, which comprises withdrawing heat from the catalyst by internal heat exchange with a gaseous medium traveling in a spiral path through the catalyst, the path of the gaseous medium being arranged so that the heat withdrawn from the successive zones of the catalyst is proportional to the amount of heat developed in those zones and returning heat to the catalyst at other zones.

7. The method of effecting catalytic exothermic gaseous reactions, which comprises withdrawing heat from the catalyst by internal heat exchange with a gaseous medium and in proportion to the amount of heat developed in the successive zones of the catalyst and returning heat to succeeding zones of the catalyst in proportion to the capacity of the catalyst to absorb heat in those zones.

8. The method of effecting catalytic exothermic gaseous reactions, which comprises withdrawing heat from the catalyst by internal heat exchange with a gaseous medium traveling in a spiral path through the catalyst, the path of the gaseous medium being arranged so that the heat withdrawn from successive zones of the catalyst is proportional to the amount of heat developed in those zones and returning heat to the catalyst in succeeding zones by passing the gaseous medium through the latter zones in a spiral path.

9. The method of effecting catalytic exothermic gaseous reactions, which comprises withdrawing heat from the catalyst by internal heat exchange with a gaseous medium traveling in a spiral path through the catalyst, the path of the gaseous medium being arranged so that the heat withdrawn from successive zones of the catalyst is proportional to the amount of heat developed in those zones and returning heat to the catalyst in succeeding zones by passing the gaseous medium through the latter zones in a spiral path, the latter path being arranged so that the heat returned is proportional to the capacity of the catalyst to absorb heat from the gaseous medium.

10. In an apparatus for effecting catalytic exothermic gaseous reactions, a catalyst and a gas conduit embedded in the catalyst and arranged to permit the withdrawal of heat from successive zones of the catalyst in proportion to the amount of heat developed in those zones.

11. In an apparatus for effecting catalytic exothermic gaseous reactions, a catalyst and a gas conduit embedded in the catalyst and arranged to permit the withdrawal of heat from successive zones of the catalyst in proportion to the amount of heat developed in those zones, the conduit being extended into succeeding zones of the catalyst and permitting the return of heat thereto.

12. In an apparatus for effecting catalytic exothermic gaseous reactions, a catalyst and a gas conduit spirally disposed within the catalyst, the loops of the conduit differing in diameter and number in the successive zones of the catalyst to permit withdrawal of heat from the catalyst in proportion to the amount of heat developed in those zones.

13. In an apparatus for effecting catalytic exothermic gaseous reactions, a catalyst and a gas conduit spirally disposed within the catalyst, the loops of the conduit differing in diameter and number in successive zones of the catalyst to permit withdrawal of heat from some of the zones in proportion to the amount of heat developed therein and the return of heat to succeeding zones.

14. In an apparatus for effecting catalytic exothermic gaseous reactions, a catalyst and a gas conduit spirally disposed within the catalyst, the loops of the conduit differing in diameter and number in the successive zones of the catalyst to permit withdrawal of heat from the catalyst in proportion to the amount of heat developed in those zones, the conduit being extended to return and discharge to the catalyst adjacent the point of entrance of the gas thereto.

In testimony whereof I affix my signature.

SAMUEL K. VARNES.